United States Patent
Hirabayashi et al.

(10) Patent No.: US 9,707,514 B2
(45) Date of Patent: Jul. 18, 2017

(54) NITRIC OXIDE REDUCING CATALYST, METHOD FOR REDUCING NITRIC OXIDE, METHOD FOR PRODUCING NITROGEN, METHOD FOR TREATING NITRIC OXIDE AND CARBON MONOXIDE

(71) Applicants: Shinichi Hirabayashi, Nagoya (JP); Masahiko Ichihashi, Chiba (JP)

(72) Inventors: Shinichi Hirabayashi, Nagoya (JP); Masahiko Ichihashi, Chiba (JP)

(73) Assignees: TOYOTA JIDOAHS KABUSHIKI KAISHA, Aichi-ken (JP); GENESIS RESEARCH INSTITUTE, INC., Aichi-ken (JP)

( * ) Notice: Subject to any disclaimer, the term of this patent is extended or adjusted under 35 U.S.C. 154(b) by 0 days.

(21) Appl. No.: 14/906,782

(22) PCT Filed: Jul. 24, 2014

(86) PCT No.: PCT/IB2014/001665
§ 371 (c)(1),
(2) Date: Jan. 21, 2016

(87) PCT Pub. No.: WO2015/011560
PCT Pub. Date: Jan. 29, 2015

(65) Prior Publication Data
US 2016/0175773 A1    Jun. 23, 2016

(30) Foreign Application Priority Data
Jul. 25, 2013 (JP) .................................. 2013-154350
Apr. 28, 2014 (JP) .................................. 2014-092546

(51) Int. Cl.
| | | |
|---|---|---|
| B01D 53/56 | (2006.01) |
| B01D 53/62 | (2006.01) |
| B01D 53/86 | (2006.01) |
| B01D 53/94 | (2006.01) |
| B01J 23/72 | (2006.01) |
| B01J 35/00 | (2006.01) |
| B01J 37/34 | (2006.01) |

(52) U.S. Cl.
CPC ....... *B01D 53/8628* (2013.01); *B01D 53/864* (2013.01); *B01D 53/869* (2013.01);
(Continued)

(58) Field of Classification Search
CPC ...... B01D 53/56; B01D 53/565; B01D 53/62; B01D 53/8628; B01D 53/864;
(Continued)

(56) References Cited

U.S. PATENT DOCUMENTS 6,033,461 A * 3/2000 Yang ..................... B01D 53/04
423/213.2
2013/0156668 A1   6/2013 Spurk et al.

FOREIGN PATENT DOCUMENTS

CN  104892643 A * 9/2015 .............. C07F 1/08
CN  103817347 B * 1/2016 .............. B22F 9/24
(Continued)

OTHER PUBLICATIONS

Shinichi Hirabayashi et al.: "Reactions of copper cluster cations with nitrous oxide: Oxidation and sequential N$_2$O adsorption", Chemical Physics Letters 533, pp. 15-19 (2012).
(Continued)

*Primary Examiner* — Timothy Vanoy
(74) *Attorney, Agent, or Firm* — Sughrue Mion, PLLC (57) ABSTRACT

The nitric oxide reducing catalyst contains a negatively charged copper cluster.

16 Claims, 3 Drawing Sheets

(52) U.S. Cl.
CPC ............ *B01D 53/945* (2013.01); *B01J 23/72* (2013.01); *B01J 35/006* (2013.01); *B01J 35/0013* (2013.01); *B01J 37/347* (2013.01); *B01D 2255/20761* (2013.01); *B01D 2255/65* (2013.01); *B01D 2255/9202* (2013.01); *B01J 35/0033* (2013.01); *Y02T 10/22* (2013.01)

(58) Field of Classification Search
CPC ........ B01D 53/9413; B01D 2253/1124; B01D 2255/20761; B01D 2257/404; B01D 2257/502
See application file for complete search history.

(56) References Cited

FOREIGN PATENT DOCUMENTS

| | | |
|---|---|---|
| EP | 2428659 A1 | 3/2012 |
| JP | 2003-185632 A | 7/2003 |
| JP | 2009-090239 A | 4/2009 |
| JP | 2012-166175 A | 9/2012 |
| JP | 2012166175 A * | 9/2012 ............ B01J 23/72 |
| JP | 2012-217970 A | 11/2012 |

OTHER PUBLICATIONS

Shinichi Hirabayashi et al.: "CO Oxidation on Copper Cluster Ions", The Journal of the Society of Nano Science and Technology, vol. 10 No. 1, pp. 41-44 (2011).

Marie L. Anderson et al.: Nitric Oxide Decomposition on Small Rhodium Clusters, $Rh_n$, The Journal of Physical Chemistry A, 110, pp. 10992-11000 (2006).

Shinichi Hirabayashi et al.: CO oxidation by copper cluster anions, European Physical Journal D: Atoms, Molecules, Clusters Andoptical Physics, EDP Sciences, Les Ulis, FR, vol. 67:35, No. 2, Mar. 6, 2013, pp. 1-6, XP035305085, ISSN: 1434-6060, DOI: 10.1140/EPJD/E2012-30493-5.

* cited by examiner

NITRIC OXIDE REDUCING CATALYST, METHOD FOR REDUCING NITRIC OXIDE, METHOD FOR PRODUCING NITROGEN, METHOD FOR TREATING NITRIC OXIDE AND CARBON MONOXIDE

BACKGROUND OF THE INVENTION

1. Field of the Invention

The invention relates to a nitric oxide reducing catalyst containing a negatively charged copper cluster and to a method for reducing nitric oxide and a method for producing nitrogen using the catalyst. The invention also relates to a catalyst containing a negatively charged copper cluster for reducing nitric oxide as well as oxidizing carbon monoxide and to a method for reducing nitric oxide as well as oxidizing carbon monoxide using the catalyst.

2. Description of Related Art

Noble metals have been conventionally used for catalysts with various applications. For example, noble metal catalysts such as platinum, palladium and rhodium have been used for cleaning up hazardous components contained in exhaust gas from automobiles and the like such as nitrogen oxides (NOx), carbon monoxide (CO) and hydrocarbons (HC).

Methods for reducing NOx or oxidizing CO using various metals have been reported to date. For example, it has been reported that nitric oxide (NO) can be reduced to nitrogen ($N_2$) with a rhodium cluster (The Journal of Physical Chemistry A 110, 10992-11000 (2006)), a bimetallic cluster containing gold and copper (Japanese Patent Application Publication No. 2012-217970 (JP 2012-217970 A)) or a cobalt cluster (Japanese Patent Application Publication No. 2009-90239 (JP 2009-90239 A)).

It has also been reported that carbon monoxide (CO) can be oxidized to carbon dioxide ($CO_2$) with a negatively charged copper cluster (Japanese Patent Application Publication No. 2012-166175 (JP 2012-166175 A); and The bulletin of the Society of Nano Science and Technology 10(1), 41-44 (2011); and The European Physical Journal D67, 35 (2013)).

As described above, in spite of investigations on various metals in order to use them for reducing NO, noble metals have still been predominantly used. As noble metals are a precious resource, use thereof faces problems of increased cost. Oxidation of CO also faces the similar problem.

SUMMARY OF THE INVENTION

The invention provides a catalyst for reducing NO containing an inexpensive metal instead of noble metals. The invention also provides a method for reducing NO using the catalyst and a method for producing $N_2$ from NO by using the catalyst. The invention further provides a catalyst allowing simultaneous reduction of NO and oxidation of CO and a method for simultaneously carrying out reduction of NO and oxidation of CO by using the catalyst.

As a result of exhaustive investigations, the inventors have found that NO can be reduced with a negatively charged copper cluster. The inventors have also found that reduction of NO and oxidation of CO can be simultaneously realized by using a negatively charged copper cluster, thereby allowing purification of exhaust gas containing NO and CO.

The first aspect of the invention pertains to a nitric oxide reducing catalyst including a negatively charged copper cluster.

The negatively charged copper cluster may contain 2×p copper atoms, wherein p may be an integer of not less than 4, or p may be an integer of 4 to 8, or p may be an integer of 4 to 6.

The negatively charged copper cluster may be partially oxidized. The negatively charged copper cluster may contain 1 or 2 oxygen atoms.

The negatively charged copper cluster may be supported on a carrier.

The nitric oxide reducing catalyst for reducing nitric oxide to form nitrogen simultaneously with oxidization of carbon monoxide to form carbon dioxide may be provided.

The nitric oxide and the carbon monoxide may be removed from exhaust gas.

The second aspect of the invention pertains to a method for reducing nitric oxide including a step of reducing nitric oxide to nitrogen in the presence of the nitric oxide reducing catalyst.

The third aspect of the invention pertains to a method for producing nitrogen including a step of converting nitric oxide to nitrogen in the presence of the nitric oxide reducing catalyst.

The fourth aspect of the invention pertains to a method for treating nitric oxide and carbon monoxide including a first step of allowing reaction of the nitric oxide reducing catalyst with nitric oxide to form an oxidized nitric oxide reducing catalyst and nitrogen; and a second step of allowing reaction of the oxidized nitric oxide reducing catalyst with carbon monoxide to form the nitric oxide reducing catalyst reduced to the original state and carbon dioxide.

The nitric oxide reducing catalyst reduced to the original state in the second step may be reused in the first step.

The nitric oxide and the carbon monoxide may be removed from exhaust gas.

The copper cluster contained in the nitric oxide reducing catalyst may have an oxygen atom, and when n represents the number of copper atoms and m represents the number of oxygen atoms, m may be not more than n/2 in the first and second steps.

According to the invention, NO can be reduced with an inexpensive metal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Nitric Oxide Reducing Catalyst>

An embodiment of the invention pertains to a nitric oxide reducing catalyst including a negatively charged copper cluster. The catalyst according to the embodiment of the invention contains a cluster formed with an inexpensive copper atom and thus allows reduction of NO with decreased cost.

The copper cluster contained in the catalyst according to the embodiment of the invention is negatively charged (a copper cluster anion). Copper atoms in the copper cluster are preferably partially oxidized as described hereinbelow. In order to allow reduction of NO to $N_2$, at least two molecules of NO are required to be adsorbed on the copper cluster. If a copper cluster is positively charged, the cluster adsorbs less NO, resulting in decreased reduction thereof to $N_2$. In contrast, the copper cluster which is negatively charged may easily adsorb NO, resulting in facilitation of reduction thereof to $N_2$. Two oxygen atoms (O) generated by reduction of two molecules of NO may be desorbed from the copper cluster as $O_2$, or may be retained on the copper cluster.

The copper cluster may have any valence of anion without limitation, which may be, for example, mono- to tri-valent, preferably mono- or di-valent and more preferably monovalent. The copper cluster of the anion with such a valence may exhibit an improved NO reduction ability.

The copper cluster is a group of a plurality of copper atoms bound together. The copper cluster may contain any number of copper atoms as far as the cluster has NO-reducing activity. The copper cluster may contain, for example, 6 to 100, preferably 8 to 50, more preferably 8 to 20, still more preferably 8 to 16 and particularly preferably 8 to 12 copper atoms. The copper cluster containing copper atoms at the above range may, exhibit an improved NO reduction ability. The copper cluster containing less number of atoms allows reduction in the amount of copper used.

In view of further promoting adsorption of NO by the copper cluster as well as improving the NO reduction ability, the copper cluster preferably contains copper atoms at an even number. For example, the cluster contains 2×p copper atoms [wherein p is an integer of not less than 3 (the number of copper atoms: an even number of not less than 6)], [wherein p is an integer of not less than 4 (the number of copper atoms: an even number of not less than 8)], [wherein p is an integer of 4 to 25 (the number of copper atoms: an even number of 8 to 50)], [wherein p is an integer of 4 to 10 (the number of copper atoms: an even number of 8 to 20)], [wherein p is an integer of 4 to 8 (the number of copper atoms: an even number of 8 to 16)], [wherein p is an integer of 4 to 6 (the number of copper atoms: an even number of 8 to 12)] or [wherein p is an integer of 4 or 5 (the number of copper atoms: 8 or 10)]. The copper cluster containing copper atoms at the above numeral range may have an improved adsorption of NO which may be associated with an improved NO reduction ability.

The catalyst according to the embodiment of the invention may contain only a copper cluster containing a specific number of copper atoms or may contain a combination of more than one copper clusters each of which contains different number of copper atoms.

The copper cluster preferably contains only copper as a metal; however the cluster may also contain another metal as far as another metal does not adversely affect the NO reduction ability. The copper cluster preferably has a copper content of, on the basis of all metals contained in the copper cluster, 90 to 100% by atom, more preferably 95 to 100% by atom, still more preferably 97 to 100% by atom and particularly preferably 99 to 100% by atom. In order to avoid an increase in cost, it is preferable that the copper cluster does not include a noble metal (gold, silver, platinum, palladium, rhodium, iridium, ruthenium or osmium). The copper cluster may contain a metal and an oxygen.

In view of further improving adsorption of NO by the copper cluster, the copper cluster preferably contains some copper atoms having an oxidation, number changed to a positive value and the copper cluster is preferably partially oxidized to be a copper oxide cluster. The copper cluster oxidized so as to have, for example, 1 to 4, preferably 1 to 3, more preferably 1 or 2 and particularly preferably 2 oxygen atoms may have further improved adsorption of NO which may be associated with an improved NO reduction ability.

The copper cluster may be supported on a carrier. The copper cluster supported on a carrier may be avoided from aggregation, resulting in stable existence thereof. The copper cluster supported on a carrier may also be prevented from thermal decomposition because the carrier can rapidly release heat generated by NO reduction reaction.

The carrier is not particularly limited as far as it can retain negative charge of the copper cluster after supporting the copper cluster. Namely, it is not preferable to use a carrier which eliminates negative charge of the copper cluster after supporting the negatively charged copper cluster. Thus the carrier used is preferably a carrier donating an electron to copper or a carrier having an electronegativity at or lower than that of copper. The carrier may include, for example, metal oxides such as silicon oxide, aluminum oxide and cerium oxide; organic polymers; activated carbon and the like.

The carrier may alternatively include a metal oxide having an atomic defect on the partial surface of the carrier. The copper cluster can be negatively charged by allowing the carrier to support the copper cluster at the defect because the defect retains electrons (see, for example, J. Phys. Chem. A 1999, 103, 9573-9578). The metal oxide may include, for example, magnesium oxide, titanium oxide and the like.

Although the copper cluster is not required to contain a ligand, the copper cluster may contain a ligand as far as the ligand does not adversely affect the NO reduction ability. The ligand is not particularly limited as to the type thereof and may include those conventionally available. However, the ligand is preferably the one which can be easily removed by heating and the like.

<Method for Reducing Nitric, Oxide and Method for Producing Nitrogen>

An embodiment of the invention pertains to a method for reducing nitric oxide including a step of reducing nitric oxide to nitrogen in the presence of the nitric oxide reducing catalyst. The method may also be regarded as a method for producing nitrogen including a step of converting nitric oxide to nitrogen in the presence of the nitric oxide reducing catalyst.

When the method according to the embodiment of the invention includes use of a copper oxide cluster, the copper cluster may be preliminarily oxidized before supply of NO, or NO together with oxygen may be supplied to the copper cluster.

The amount of the catalyst and the concentration of NO are not particularly limited and may be appropriately adjusted. Although the temperature condition is not particularly limited, the temperature is preferably a room temperature in view of decreasing energy required for changing temperature. The method according to the embodiment of the invention may be carried out in a batch manner or a continuous manner.

<Method for Producing Nitric Oxide Reducing Catalyst and Evaluation Thereof>

The negatively charged copper cluster in the nitric oxide reducing catalyst according to the embodiments of the invention can be produced in a liquid or gas phase. In a liquid phase, a conventional method may be used (see, for example, Langmuir 2010, 26(6), 4473-4479). In a gas phase, methods such as ion sputtering, magnetron sputtering, plasma discharge, laser ablation may be used. The ion sputtering method employed in Examples is hereinafter illustrated by referring to FIG. 1 (see also Japanese Patent Application Publication No. 2003-185632 (JP 2003-185632 A)).

Figure 1:
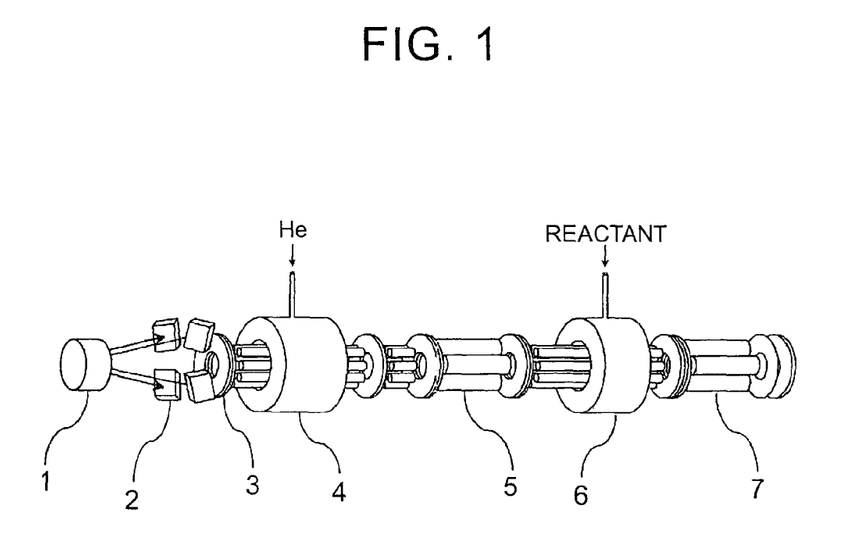
FIG. 1 shows a copper cluster collision reaction experimental apparatus for ion sputtering and tandem mass spectrometry.

A cluster production chamber (not shown) contains a copper target 2, wherein the copper target 2 is irradiated with ions (e.g., xenon ions) from the ion gun 1, so that copper clusters with various sizes and various charges (positive and negative charges) are released into a gas phase.

The copper clusters having negative charge among those generated are selected by means of, an ion lens 3 and are transported to a cooling cell 4. To the cooling cell 4 is introduced rare gas (e.g., helium) having low temperature and the copper clusters are cooled by means of collision of the copper clusters with rare gas. The copper clusters and rare gas may also be cooled by circumferentially cooling the cooling cell 4. By this cooling step, decomposition of the copper clusters may be decreased and the copper clusters may be efficiently selected based on size of the copper cluster in the next step.

In order to oxidize the copper clusters, rare gas as well as gas for oxygen supply (e.g., oxygen, nitrous oxide, etc.) are introduced to the cooling cell 4.

The cooled copper clusters are transported to a mass spectrometer 5 where the copper clusters are selected based on size of the copper cluster. The mass spectrometer 5 may be a quadrupole mass spectrometer. The quadrupole mass spectrometer allows selection of copper clusters having certain elements, composition and total number of atoms. Instead of the quadrupole mass spectrometer, a magnetic deflection mass spectrometer may be used. The magnetic deflection mass spectrometer allows accurate selection of copper clusters even with the mass number of higher than 4,000.

The selected copper clusters having a particular size are transported to a reaction cell 6. To the reaction cell 6 is introduced a reactant (NO) which collides with the copper clusters.

Unreacted and product ions in the reaction is transported to a mass spectrometer 7 to give a mass spectrum. Based on the mass spectrum, the reaction cross-section is determined. Accordingly the reaction cross-section of copper clusters selected in the mass spectrometer 5 can be determined. By altering the type of copper clusters selected in the mass spectrometer 5, various types of copper clusters may be individually examined as to the reaction cross-section.

When the catalyst is prepared in a gas phase, copper clusters are generated by ion irradiation. Clusters negatively charged copper clusters are selected among the generated copper clusters. The selected copper clusters are supported on a carrier. Thus, it is possible to produce a certain amount of catalyst.

It is commonly understood that the catalytic activity of clusters is similar when the catalytic activity of the clusters is evaluated in a gas phase and when the catalytic activity is evaluated while clusters are supported on a carrier, i.e., in the solid phase (see, for example, Nanocatalysis (NanoScience and Technology), springer, pp. 117-118). Thus although the catalytic activity of copper clusters in a gas phase is evaluated in Examples herein, it is presumed that a similar result may be obtained in case of the solid phase of the copper clusters supported on a carrier.

<Exhaust Gas Purification Catalyst and Method for Purifying Exhaust Gas>

Figure 4:
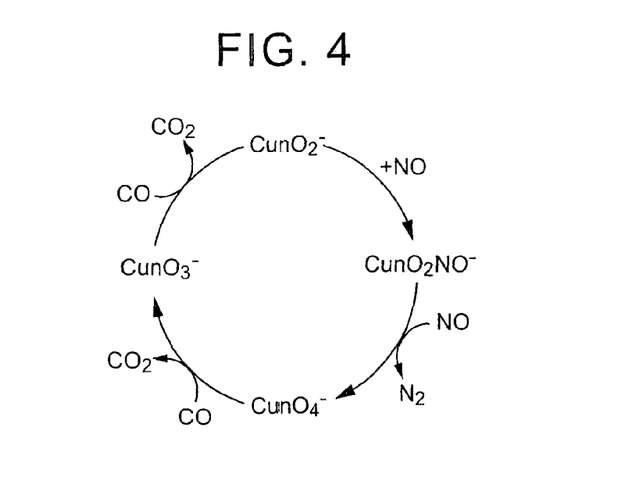
FIG. 4 shows a conceptual view of the catalytic cycle of the redox reaction by copper oxide clusters.

The nitric oxide reducing catalyst can also reduce NO to $N_2$ simultaneously with oxidizing CO to $CO_2$. The terms "simultaneous" and "simultaneously" as used herein mean that reduction of NO and oxidation of CO occur in one catalytic cycle. For example, as shown in FIG. 4, a copper oxide cluster ($Cu_nO_2^-$) reacts with NO to form an oxidized copper oxide cluster ($Cu_nO_4^-$) and $N_2$, followed by reaction of $Cu_nO_4^-$ with CO to form the copper oxide cluster ($Cu_nO_2^-$) reduced to resume the initial state and $CO_2$, thereby completing the catalytic cycle.

Thus an embodiment of the invention also pertains to the nitric oxide reducing catalyst for reducing NO to form $N_2$ simultaneously with oxidation of CO to form $CO_2$. An embodiment of the invention also pertains to a method for treating NO and CO including a first step of allowing reaction of the nitric oxide reducing catalyst with NO to form an oxidized nitric oxide reducing catalyst and $N_2$; and a second step of allowing reaction of the oxidized nitric oxide reducing catalyst formed in the first step with CO to form the reduced nitric oxide reducing catalyst and $CO_2$. The reduced nitric oxide reducing catalyst formed in the second step is equivalent to the nitric oxide reducing catalyst used in the first step. Thus the second step may be followed by the first step in which the catalyst may be reused. Accordingly, the catalytic cycle of the first and second steps may rotate, allowing treatment of a large amount of NO and CO with a small amount of catalyst.

Preferable aspects of the nitric oxide reducing catalyst have been described hereinabove. Without limitation, when both reduction of NO and oxidation of CO are the aim, the copper (oxide) cluster preferably contains an even number of copper atoms. Specific numbers of copper atoms have been described hereinabove. When both reduction of NO and oxidation of CO are the aim, the copper oxide cluster is preferably used inter alia. In both the first step of reducing NO and the second step of oxidizing CO, the copper oxide cluster preferably contains the number of oxygen atoms that does not exceed the stoichiometric ratio (number of Cu atoms:number of O atoms is 2:1) of copper oxide ($Cu_2O$). Namely, the copper oxide cluster preferably contains n copper atoms and m oxygen atoms, wherein m is not more than n/2.

NO and CO are hazardous components in exhaust gas. Thus the nitric oxide reducing catalyst can be used as an exhaust gas purification catalyst. The method for treating NO and CO may be used as a method for purifying exhaust gas. The exhaust gas is not particularly limited as to the type thereof and may include, for example, exhaust gas discharged from gasoline engines, diesel engines and the like.

The invention is hereinafter more specifically described by way of Examples which do not limit the invention.

The NO reduction activity of copper (oxide) clusters were evaluated by collision reaction experiments between NO and copper (oxide) clusters having various sizes and charge states (negative and positive charges). The CO oxidation activity of copper oxide clusters were evaluated by collision reaction experiments between the copper oxide clusters and CO.

<Formation of Copper (Oxide) Clusters and Activity Evaluation>

Formation of copper (oxide) clusters and activity evaluation was carried out by ion sputtering method and tandem mass spectrometry on the copper cluster collision reaction experimental apparatus shown in FIG. 1. The apparatus can be obtained by combining an ion gun 1 (Rokion Ionenstrahl-Technologie, CORDIS Ar25/35c), an ion lens 3, a cooling cell 4, a quadrupole mass spectrometer 5 (Extrel, 162-8), a reaction cell 6 and a quadrupole mass spectrometer 7 (Extrel, 162-8).

As shown in FIG. 1, copper targets 2 were irradiated with xenon ions from the ion gun 1 with an accelerating voltage of 8.5 kV to generate copper clusters having various sizes and various charge states. Only copper clusters having specific charge were extracted by the ion lens 3 and were allowed to collide with helium atoms at room temperature for multiple times in a cooling cell 4 to allow the internal temperature of copper clusters to reach thermal equilibrium. Oxygen was added to the cooling cell 4, if necessary, to generate copper oxide clusters. Only copper clusters having a specific size were selected with the quadrupole mass spectrometer 5 and were allowed to collide and react with NO in the reaction cell 6 at collision energy of 0.2 eV. The ions generated by the reaction were analyzed on the quadrupole mass spectrometer 7. The results obtained by single- or multiple-collision reactions of copper (oxide) clusters with NO are shown below.

<Results>

1. Single-Collision Reactions of Copper (Oxide) Clusters with NO

Reactions by single collision of positively charged copper clusters ($Cu_n^+$), negatively charged copper clusters ($Cu_n^-$), positively charged copper oxide clusters ($Cu_nO_m^+$) and negatively charged copper oxide clusters ($Cu_nO_m^-$) with NO were examined.

(1) $Cu_n^+$ (n=3 to 19) scarcely adsorbed NO.

Figure 2:
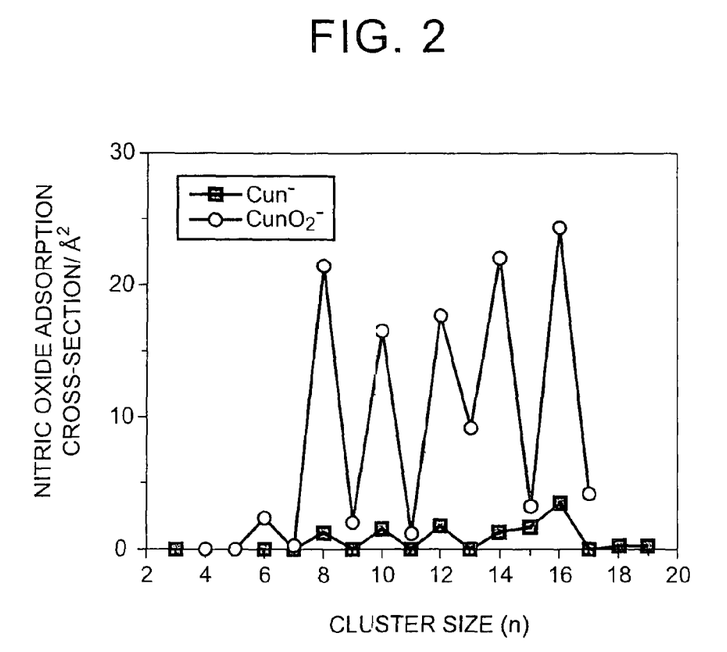
FIG. 2 shows the relation between the size of negatively charged copper (oxide) clusters and the NO adsorption cross-section.

(2) $Cu_n^-$ (n=3 to 19), particularly $Cu_n^-$ (n=an even number of 8 to 16) adsorbed NO

[$Cu_n^- + NO \rightarrow Cu_nNO^-$] (FIG. 2).

(3) $Cu_nO_m^-$ (n=4 to 17 and m=2), particularly $Cu_nO_m^-$ (n=an even number of 8 to 16 and m=2) had a dramatically improved NO adsorption

[$Cu_nO_2^- + NO \rightarrow Cu_nO_2NO^-$] (FIG. 2).

Particularly, with $Cu_nO_2^-$ (n=8, 10 or 12), in addition to simple NO adsorption, NO adsorption accompanying with Cu release represented by the following formula:

$$Cu_nO_2^- + NO \rightarrow Cu_{n-1}O_2NO^- + Cu$$

was observed. Accordingly it is suggested that NO is relatively strongly adsorbed.

(4) $Cu_nO_m^-$ (m=1) allowed observation of an improved NO adsorption.

(5) In reaction between $Cu_nO_m^+$ (m≥3) or $Cu_nO_m^-$ (m≥3) and NO, significant production of $NO_2$ was observed with specific types of $Cu_nO_m^+$. However almost no NO adsorption was observed.

Figure 3:
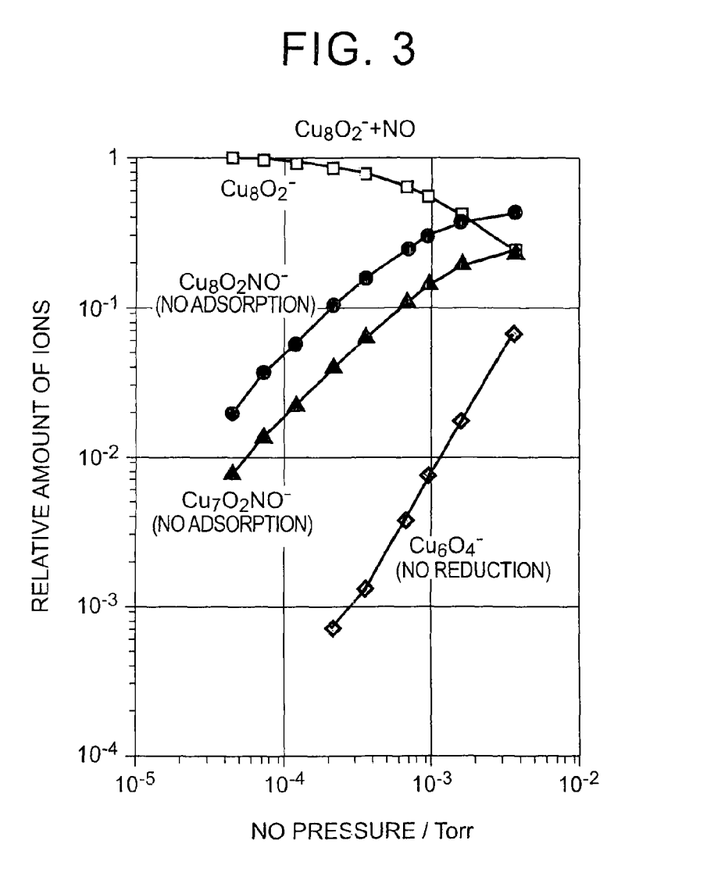
FIG. 3 shows the relation between the pressure of NO and the relative amount of copper oxide cluster ions.

2. Multiple-Collision Reactions of Copper Oxide Clusters with NO $Cu_nO_2^-$ (n=8, 10 or 12) which showed effective NO adsorption under single collision condition was examined for reaction with NO under multiple collision conditions. When the pressure of NO introduced to the reaction chamber was increased, $Cu_{n-2}O_4^-$ was observed in addition to $Cu_nO_2NO^-$ and $Cu_{n-1}O_2NO^-$ which were observed under single collision condition. The intensity of $Cu_{n-2}O_4^-$ was increased with the square of pressure of NO (FIG. 3) and thus it is suggested that NO reducing reaction represented by the following formula:

$$Cu_nO_2^- + 2NO \rightarrow Cu_{n-2}O_4^- + 2Cu + N_2$$

may occur.

Decrease in the number of copper atoms in copper clusters by reduction reaction is caused by thermal decomposition of copper clusters due to heat of reaction. Such a thermal decomposition may be avoided by supporting copper clusters to be supported on a carrier which rapidly allows release of heat of reaction. Under such a condition, it is presumed that NO reduction reaction represented by the following formula:

$$Cu_nO_2^- + 2NO \rightarrow Cu_nO_4^- + N_2$$

may occur.

According to the above results, it is found that negatively charged copper clusters, particularly negatively charged and partially oxidized copper clusters containing copper atoms at an even number can effectively react with NO to release $N_2$.

3. Single- or Multiple-Collision Reactions of Copper Oxide Clusters with CO $Cu_8O_4^-$ which is a reaction product from $Cu_8O_2^-$ having the highest NO reduction activity was examined for reaction thereof with CO under single or multiple collision conditions. As a result, CO oxidation reaction represented by the following formula:

$$Cu_8O_4^- + CO \rightarrow Cu_8O_3^- + CO_2$$

was observed.

Figure 5:
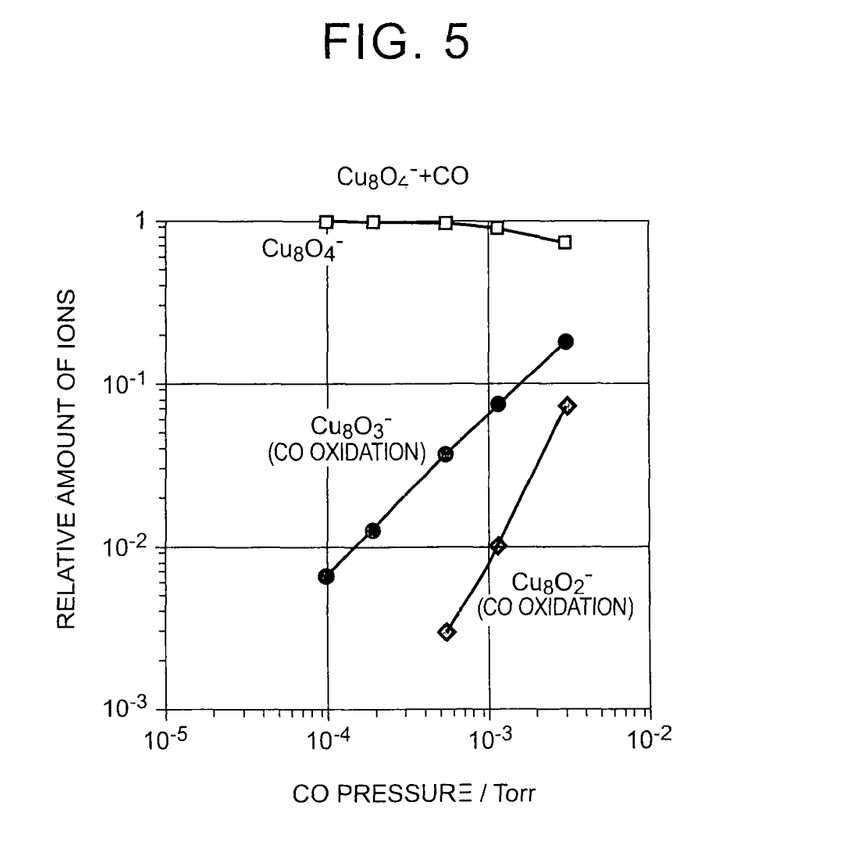
FIG. 5 shows the relation between the pressure of CO and the relative amount of copper oxide cluster ions.

When pressure of CO introduced to the reaction chamber was increased, the amount of $Cu_8O_2^-$ observed was increased (FIG. 5), and thus it is suggested that CO oxidation reaction represented by the following formula:

$$Cu_8O_4^- + 2CO \rightarrow Cu_8O_2^- + 2CO_2$$

may occur.

According to the above results, it is found that negatively charged copper clusters, particularly negatively charged and partially oxidized copper clusters containing copper atoms at an even number exhibit ability for reversible redox reaction, effectively react with NO to release $N_2$ and then react with CO to release $CO_2$. Accordingly the copper clusters can be utilized as catalysts for purifying exhaust gas containing NO and CO.

The invention claimed is:

1. A method for reducing nitric oxide, comprising:
a step of reducing nitric oxide to nitrogen in the presence of a negatively charged copper cluster.

2. The method according to claim 1, wherein
the copper cluster contains 2×p copper atoms, p being an integer of not less than 4.

3. The method according to claim 2, wherein
p is an integer of 4 to 8.

4. The method according to claim 3, wherein
p is an integer of 4 to 6.

5. The method according to claim 1, wherein
the copper cluster is partially oxidized.

6. The method according to claim 5, wherein
the copper cluster contains 1 or 2 oxygen atoms.

7. The method according to claim 1, wherein
the copper cluster is supported on a carrier.

8. The method according to claim 1, wherein
the copper cluster is a group of copper atoms bound together.

9. The method according to claim 8, wherein
the copper cluster is devoid of ligands.

10. The method according to claim 9, wherein
the copper cluster contains a metal and an oxygen.

11. The method according to claim 1, in which the negatively charged copper cluster additionally oxidizes carbon monoxide to form carbon dioxide.

12. The method according to claim 11, wherein
the nitric oxide and the carbon monoxide are removed from an exhaust gas.

13. A method for treating nitric oxide and carbon monoxide, comprising:
a first step of the method according to claim 1 to form an oxidized negatively charged copper cluster as well as the nitrogen; and
a second step of allowing reaction of the oxidized negatively charged copper cluster with carbon monoxide to reduce the negatively charged copper cluster to its original state and carbon dioxide.

14. The method according to claim 13, wherein
the negatively charged copper cluster reduced to the original state in the second step is reused in the first step.

15. The method according to claim 13, wherein
the nitric oxide and the carbon monoxide are removed from exhaust gas.

16. The method according to claim 13, wherein
the negatively charged copper cluster contains an oxygen atom, and
when n represents the number of copper atoms and m represents the number of oxygen atoms, m is not more than n/2 in the first and second steps.

* * * * *

UNITED STATES PATENT AND TRADEMARK OFFICE
CERTIFICATE OF CORRECTION

PATENT NO.        : 9,707,514 B2
APPLICATION NO.   : 14/906782
DATED             : July 18, 2017
INVENTOR(S)       : Shinichi Hirabayashi and Masahiko Ichihashi

Page 1 of 1

It is certified that error appears in the above-identified patent and that said Letters Patent is hereby corrected as shown below:

On the Title Page

Column 1, (73) Assignees, Line 1:
"TOYOTA JIDOAHS KABUSHIKI KAISHA" has been replaced with -- TOYOTA JIDOSHA KABUSHIKI KAISHA --

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*